J. N. POWERS.
DEMOUNTABLE RIM FOR AUTOMOBILE WHEELS.
APPLICATION FILED AUG. 13, 1919.
1,379,418.
Patented May 24, 1921.
2 SHEETS—SHEET 1.
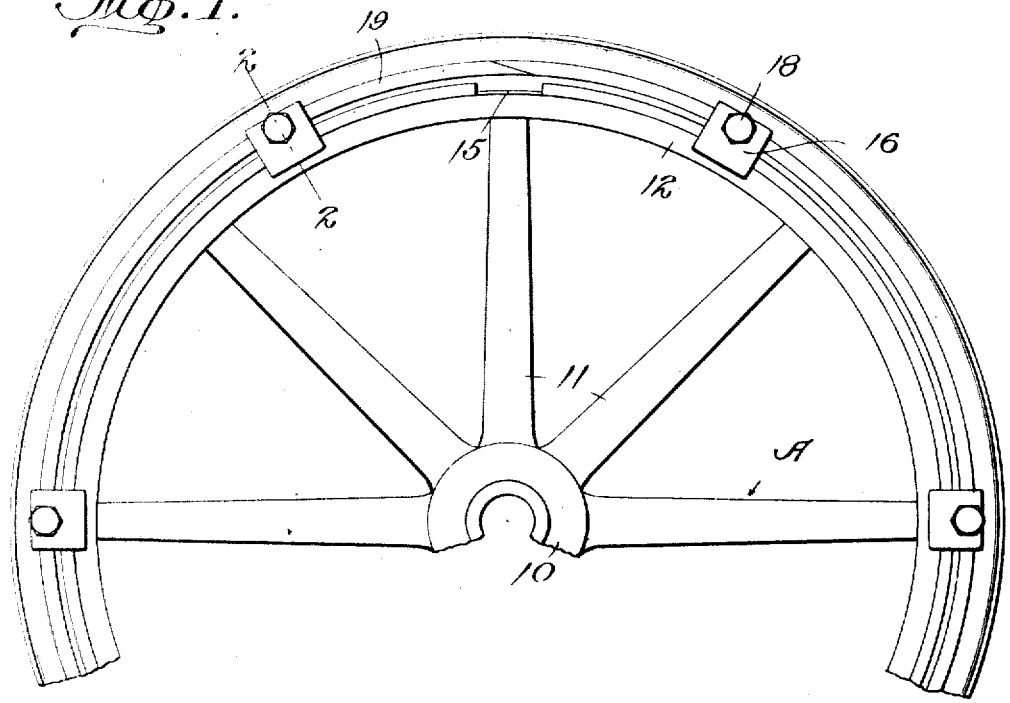
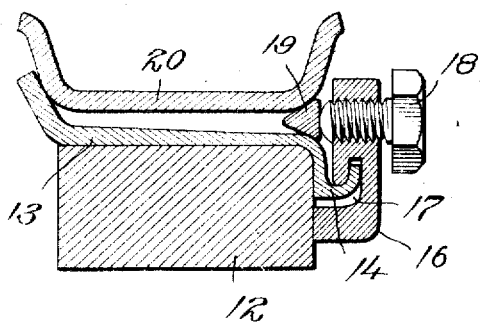
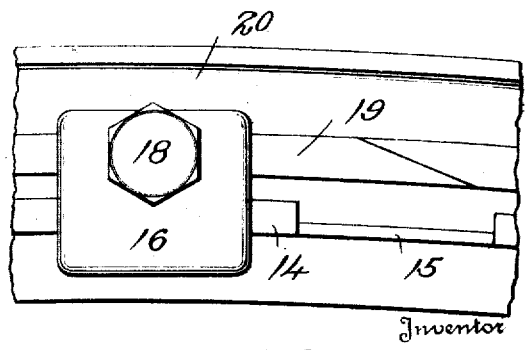
Inventor
J. N. Powers.
By Henry T. Bright
Attorney

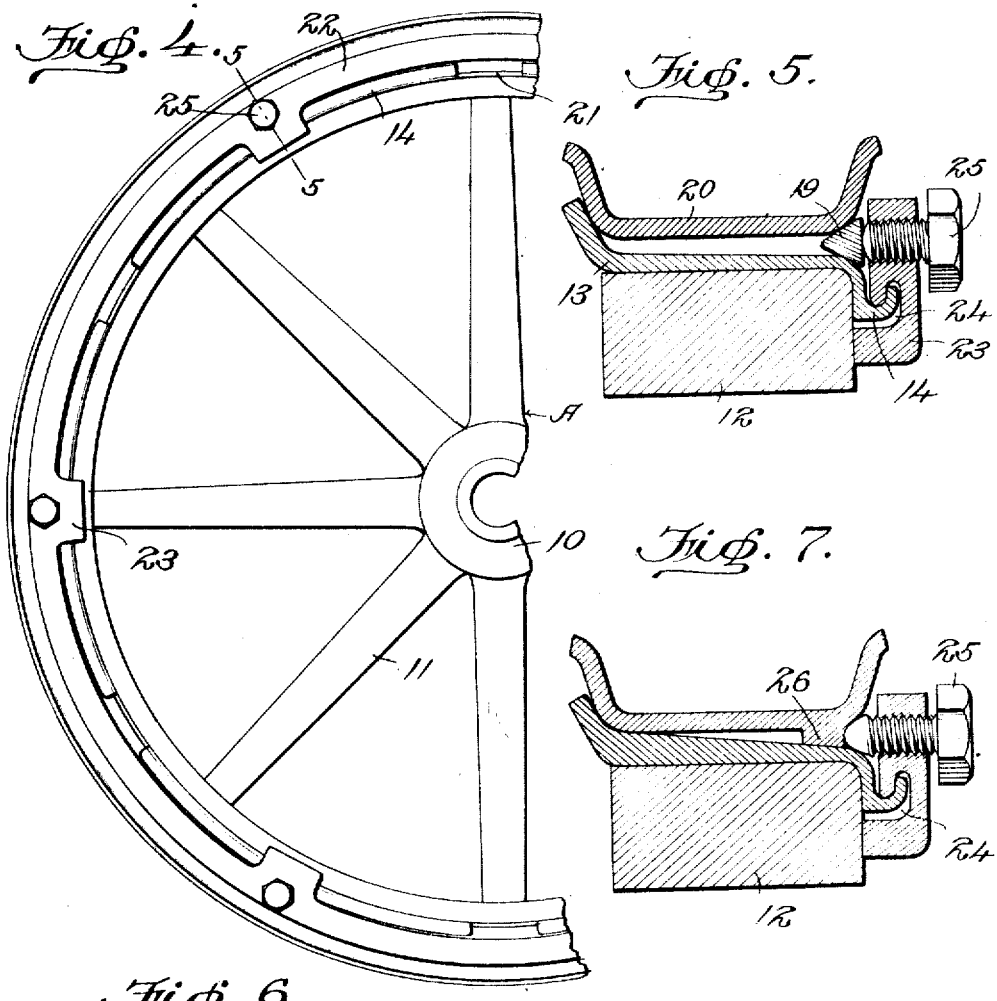
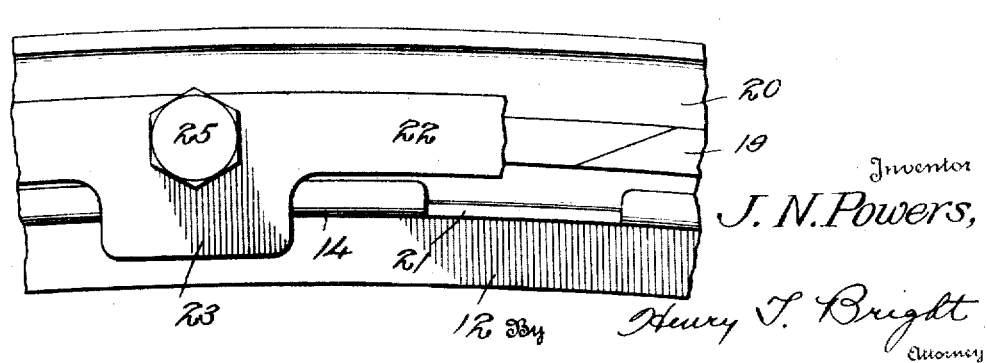

UNITED STATES PATENT OFFICE.

JOHN N. POWERS, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA.

DEMOUNTABLE RIM FOR AUTOMOBILE-WHEELS.

1,379,418.  Specification of Letters Patent.  Patented May 24, 1921.

Application filed August 13, 1919. Serial No. 317,136.

*To all whom it may concern:*

Be it known that I, JOHN N. POWERS, a citizen of the United States, residing at Washington, District of Columbia, have invented certain new and useful Improvements in Demountable Rims for Automobile-Wheels; and I do hereby declare the following to be a full, clear, and exact description of the invention, such as will enable those skilled in the art to which it appertains to make and use the same.

My invention relates generally to automobile wheels and the like and, more particularly, to that class of automobile wheels having demountable or movable tire-holding rims.

The purpose of my invention is to provide a simple, inexpensive, and easily manufactured device capable of convenient manipulation and actuation for quickly and efficiently detachably locking the removable rim on the wheel.

With the above and other purposes in view, my present invention resides in certain novel features of form, construction, arrangement, and combination of parts all as will hereinafter be described and particularly pointed out in the claims.

In the accompanying drawings,

Figure 1 is a fragmentary side elevation of an automobile wheel equipped with my invention;

Fig. 2, an enlarged section on the line 2—2 of Fig. 1;

Fig. 3, a fragment of what is shown in Fig. 1 with one of the locking members adjusted relatively near to its point of detachment from the fixed rim;

Fig. 4, a view similar to Fig. 1 showing a modified form of my invention;

Fig. 5, an enlarged section on the line 5—5 of Fig. 4;

Fig. 6, a fragment of what is shown in Fig. 4 on an enlarged scale; and

Fig. 7, a view similar to Fig. 5 showing still another modification of my invention capable of use in connection with either the form shown in Fig. 1 or the form shown in Fig. 4.

Referring to the drawings and particularly to Figs. 1–3 inclusive A indicates generally an automobile wheel which includes a hub 10, spokes 11 and felly 12. Mounted upon the felly 12 is a fixed rim 13 provided at one side with a hook-shaped extension 14. This extension 14 is cut-away or recessed at 15 for a purpose that will presently appear. This form of my invention also embodies a plurality of locking members 16 each of which is provided with a suitably shaped recess 17 for receiving the hook-shaped extension 14 of the fixed rim so as to interlock said member with the fixed rim. To effect the desired interlocking engagement between the fixed rim and the members 16 it is only necessary to successively place said members in the recess 15 and then adjust them circumferentially of the wheel as will be obvious, it of course being understood that the recess 17 is brought into alinement with the hook portion of the extension 14 before the circumferential movement is imparted to the member. Mounted in each member 16 is a locking screw 18 which engages a split wedging ring 19 disposed between the fixed rim 13 and a removable rim 20 which latter bears the usual relation to the fixed rim. To provide a proper bearing for each member 16 I extend the lower portion of said member inwardly so that the same will engage the side of the felly 12.

In operation it will be apparent that if it is desired to set and lock the removable rim 20 in position it is only necessary to first apply the wedge ring 19 and then interlock the members 16 with the fixed rim in the manner heretofore described. These members 16 are then adjusted to the desired spaced relation and the screws 18 operated to force the wedge ring 19 between the rims. To remove the rim 20 the operation just described is reversed.

In the form of my invention illustrated in Figs. 4–6 inclusive I cut-away or recess the hook-shaped extension 14 of the fixed rim at a plurality of points spaced equal distances apart as shown at 21. The locking element in this form of my invention is constituted by a continuous ring 22 having spaced enlargements 23 located apart distances equal to the distance between adjacent recesses 21. These enlargements 23 are provided respectively with suitable recesses 24 for receiving the hook portion of the extension 14 and thereby establishing an interlocking relation between the ring 22 and the fixed rim. To apply the locking ring to the fixed rim it is only necessary to position the enlargements 23 in the recesses 21 and then rotate the ring 22 to the position shown in Fig. 4. The ring 22 carries a plurality of locking screws 25 corresponding in number to the enlargements 23 and through the medium of which the wedge ring 19 is forced between the rims 13 and 20 in the manner previously described.

In the form of my invention shown in Fig. 7 I dispense with the use of the split wedge ring and provide on the bottom of the removable rim 20 a flange 26 which is engaged by the screw 25 so that operation of the latter will set and lock the removable rim in position. This form of my invention can be utilized in connection with the construction shown in Fig. 1 and in connection with the construction shown in Fig. 4.

While I have described my invention in the best form known to me at present it will be apparent that the same is susceptible of changes in form and arrangement of parts and to desirable additions with the exercise of only ordinary mechanical skill and without departing from the scope of the claims.

I claim:

1. In a vehicle wheel, the combination of a fixed rim, a removable rim, locking means for securing the removable rim on the fixed rim including a member detachably interlocked with the fixed rim, and means carried by the member operable transversely of the fixed rim against an element to set and lock the removable rim in position.

2. In a vehicle wheel, the combination of a fixed rim, a removable rim, locking means for securing the removable rim on the fixed rim including a member detachably interlocked with the fixed rim, and a screw carried by the member and operable transversely of the fixed rim against an element to set and lock the removable rim in position.

3. In a vehicle wheel, the combination of a fixed rim, a removable rim, a wedging ring between said rims, locking means for securing the removable rim on the fixed rim including a member detachably interlocked with the fixed rim, and means carried by the member operating transversely of the fixed rim against the ring to force the latter between the rims and thereby set and lock the removable rim in position.

4. In a vehicle wheel, the combination of a felly, a fixed rim thereon, a removable rim, locking means for securing the removable rim on the fixed rim including a member detachably interlocked with the fixed rim and bearing against the felly, and means carried by the member operable transversely of the fixed rim against an element to set and lock the removable rim in position.

5. In a vehicle wheel, the combination of a fixed rim having a hook-shaped extension at one side, a removable rim, members each having recesses receiving the hook-shaped extension to interlock the members to the fixed rim and permitting adjustment of the members circumferentially of the rim, and means carried by each member operable transversely of the fixed rim against an element to set and lock the removable rim in position.

6. In a vehicle wheel, the combination of a fixed rim having a hook-shaped extension at one side, a removable rim, and a wedging ring between said rims, members each having a recess receiving the hook-shaped extension to interlock the member to the fixed rim and permitting adjustment of the members circumferentially of the rim, and means carried by the member operating transversely of the fixed rim against the ring to force the latter between the rims and thereby set and lock the removable rim in position.

7. In a vehicle wheel, the combination of a fixed rim having a plurality of spaced hook-shaped extensions at one side, a removable rim, a locking ring having a plurality of enlarged portions spaced correspondingly to the hook-shaped extensions and provided respectively with recesses for receiving the hook-shaped extensions whereby the ring is interlocked with the fixed rim by rotation thereof when the enlarged portions are disposed between the hook-shaped extensions, and means carried by the ring and operable transversely of the fixed rim against an element to set and lock the removable rim in position.

8. In a vehicle wheel, the combination of a fixed rim having a plurality of spaced hook-shaped extensions at one side, a removable rim, a locking ring having a plurality of enlarged portions spaced correspondingly to the hook-shaped extensions and provided respectively with recesses for receiving the hook-shaped extensions whereby the ring is interlocked with the fixed rim by rotation thereof when the enlarged portions are disposed between the hook-shaped extensions, and screws carried by the ring and operable against an element to set and lock the removable rim in position.

9. In a vehicle wheel, the combination of a fixed rim having a plurality of spaced hook-shaped extensions at one side, a removable rim, a wedging ring between said rims, a locking ring having a plurality of enlarged portions spaced correspondingly to the hook-shaped extensions and provided respectively with recesses for receiving the hook-shaped extensions whereby the ring is interlocked with the fixed rim by rotation thereof when the enlarged portions are disposed between the hook-shaped extensions, and means carried by the locking ring operating against the wedging ring to force the latter between the rims and thereby set and lock the removable rim in position.

In testimony whereof I affix my signature in the presence of two witnesses.

JOHN N. POWERS.

Witnesses:
ELLA L. POWERS,
W. T. POWERS.